United States Patent Office 2,771,341
Patented Nov. 20, 1956

2,771,341

METHOD FOR GAINING VANADIUM VALUES FROM VANADIUM CONTAINING IRON ORES

Otto F. F. Barth, Stocksund, Sweden, assignor to Hoganis-Billesholms Aktiebolag, Hoganis, Sweden, a company of Sweden No Drawing. Application July 17, 1951,
Serial No. 237,295

2 Claims. (Cl. 23—51)

It has been suggested to roast vanadium containing iron ores with sodium carbonate and afterwards to leach out sodium vanadate from the roasted products by means of water. Sintering of the material during the roasting process has been avoided or minimized in order to make unnecessary the crushing and grinding of the sintered product before leaching.

By investigations the inventor has now found that alkali vanadate can be practically completely leached out with water from sintered products produced according to the known methods in lumps of a size suitable for charging a blast furnace.

The present invention which is based upon this discovery relates to an improvement in the method for the production of sinter, sintered briquettes and sintered pellets from iron ore concentrate containing vanadium. The method according to the invention consists mainly in that such iron ore concentrate before the sintering or before it is formed into briquettes or pellets of a size suitable for charging a reduction furnace is mixed with an alkali compound, preferably carbonate of soda after which said concentrate or the said briquettes or pellets are sintered and after sintering are leached with water and sodium vanadate is recovered from the leach solution.

As is clearly understood from the above it is, thus, possible to apply the invention to the usual sintering processes. In other words this embodiment of the invention so to speak consists in the method of adding an alkali compound to the starting material in the usual sintering processes and leaching the end product.

*Example.*—A titanium and vanadium containing iron ore concentrate containing 0.6% of vanadium was mixed with 5% of sodium carbonate, pressed to briquettes and sintered at a temperature between 1100–1300° C. After sintering the briquettes without first being crushed were leached with water at elevated temperature (below 100° C.). Thereby 97% of the vanadium content of the starting material was obtained in the leach solution.

What I claim is:

1. Process for the recovery of vanadium from vanadium containing iron ore which comprises mixing ingredients consisting essentially of such iron ore in finely divided form and an alkali metal compound, sintering the resulting mixture at a temperature of at least about 1100° C. for the production of lumps of a size suitable for charging a blast furnace, and leaching said lumps with water.

2. Process as defined in claim 1 in which the ore contains less than 1% of vanadium, and is mixed with about 5% of sodium carbonate and the mixture is pressed into briquettes prior to sintering.

References Cited in the file of this patent

UNITED STATES PATENTS

| | | |
|---|---|---|
| 828,850 | Haynes et al. | Aug. 14, 1906 |
| 1,015,469 | Bleecker | Jan. 23, 1912 |
| 1,964,719 | Carpenter | July 3, 1934 |
| 2,077,096 | Carpenter | Apr. 13, 1937 |
| 2,131,006 | Dean | Sept. 20, 1938 |
| 2,394,793 | Maier | Feb. 12, 1946 |
| 2,482,311 | Asak | Sept. 20, 1949 |
| 2,501,952 | Maier | Mar. 28, 1950 |
| 2,511,400 | Jahn | June 13, 1950 |
| 2,576,445 | Cole et al. | Nov. 27, 1951 |